US006473810B1

United States Patent
Patel et al.

(10) Patent No.: US 6,473,810 B1
(45) Date of Patent: Oct. 29, 2002

(54) CIRCUITS, SYSTEMS, AND METHODS FOR EFFICIENT WAKE UP OF PERIPHERAL COMPONENT INTERCONNECT CONTROLLER

(75) Inventors: Krunali T. Patel, Allen, TX (US); Mark A. Beadle, Allen, TX (US); David W. Rekieta, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/407,471

(22) Filed: Sep. 28, 1999

Related U.S. Application Data

(60) Provisional application No. 60/102,067, filed on Sep. 28, 1998.

(51) Int. Cl.[7] .................................................. G06F 3/00
(52) U.S. Cl. ................................. 710/7; 710/10; 710/28; 713/1; 713/324; 713/340
(58) Field of Search ..................... 713/7, 2, 100, 713/300, 323, 324, 1, 340; 710/8, 9, 10, 22, 104, 1, 5, 7, 20, 28, 129; 712/36

(56) References Cited

U.S. PATENT DOCUMENTS

| | | | | |
|---|---|---|---|---|
| 5,860,125 A | * | 1/1999 | Reents | 711/166 |
| 5,940,005 A | * | 8/1999 | Severson et al. | 340/825.52 |
| 5,968,156 A | * | 10/1999 | Kim | 710/129 |
| 6,058,474 A | * | 5/2000 | Baltz et al. | 713/1 |
| 6,067,627 A | * | 5/2000 | Reents | 713/325 |
| 6,289,436 B1 | * | 9/2001 | Terashima | 712/36 |
| 6,320,575 B1 | * | 11/2001 | Terashima et al. | 345/213 |

* cited by examiner

*Primary Examiner*—Jeffrey Gaffin
*Assistant Examiner*—Rijue Mai
(74) *Attorney, Agent, or Firm*—Alan K. Stewart; Wade James Brady, III; Frederick J. Telecky, Jr.

(57) ABSTRACT

A controller ($20_3$) for coupling between a computer bus (20) and one or more units ($22_1$, $22_2$) compatible with the bus. The controller comprises a first input (28) for receiving a first reset signal issued from the computer bus, and a second input (30) for receiving a second reset signal. The controller further comprises circuitry (26) for storing a first set of information which will be cleared in response to assertion of the first reset signal. Lastly, the controller comprises circuitry (24) for storing a second set of information which will not be cleared in response to assertion of the first reset signal but which will be cleared in response to assertion of the second reset signal. In a described embodiment, the bus is a PCI bus, the first reset signal is a PCI Reset signal, and the second reset signal is an initialization signal.

9 Claims, 1 Drawing Sheet

CIRCUITS, SYSTEMS, AND METHODS FOR EFFICIENT WAKE UP OF PERIPHERAL COMPONENT INTERCONNECT CONTROLLER

This application claims this benefits of Provisional Applications No. 60/102,067, filed Sep. 28, 1998.

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to devices including peripheral component interconnect (PCI) buses such as laptop computers, and are more particularly directed to circuits, systems, and methods for efficient wake up operations for controllers for PCI devices.

As computer systems advance in development, various techniques are evolving to produce more power efficient machines. For example, in the instance of portable computers such as laptops and notebook computers, it is desirable to improve power efficiency so that the rechargeable power supply lasts a greater amount of time between recharge periods. Therefore, various techniques have arisen to reduce power consumption in these types of computers, particularly during periods of reduced activity or non-use, such as when the user has not operated the keyboard for a particular amount of time. Power consumption techniques also arise in the context of desktop computers. For example, many users prefer to leave their computers turned on during lengthy periods of non-use, and even overnight for purposes of serving other computers, convenience, receiving facsimile transmissions, or simply to avoid a lengthy boot-up procedure upon returning to the computer the next day. During these periods of non-use, power reduction is also beneficial. Lastly, the combination of portable computers and desktop computers in so-called docking bay configurations also benefits from power adjustments, particularly in instances where the portable computer is removed from the dock, thereby changing the power consumption considerations. These varying configurations each may benefit from improved power performance.

One current approach to power reduction in portable computer systems is directed to operations of devices coupled to the PCI bus. More specifically, different levels of operation are associated with the current PCI standard according to the power considerations for those levels. For example, at level D0, devices connected to the PCI bus are at full operation. In levels D1 and D2, overall voltage and current are not reduced to the PCI-connected devices, but power consumption otherwise may be reduced such as by reducing the clock speed provided to various devices. In a more conservative state of operation referred to as the D3 cold state, the voltage supplied to the PCI-connected devices is referred to as $V_{aux}$ rather than the $V_{CC}$ level which applies in any of D0 through D2, and during this state the available current to the PCI-connected devices is considerably reduced. This D3 cold state is also sometimes referred to as a deep sleep state. In any event, it is this D3 cold state to which the preferred embodiments are directed by way of example, and thus it is primarily this state and other PCI related principles which are discussed herein.

By way of further background, it is noted that the present PCI standard does not contemplate certain advancements in power reduction circuits and methodology. Specifically, in the context of evolving to the D3 cold state under the state of the art, the PCI specification in its current form creates an inconsistency. Particularly, under current systems using the PCI standard an assertion by the PCI bus of a single active low reset signal may be contemplated to place the PCI-connected units into a deep sleep state. As a result, however, with no additional improvement to the state of the art, this reset signal causes any device connected to receive such signal to operate in the same manner as any ordinary reset. Such a reset typically initializes the device and thereby clears various state and other information in the device. Indeed, either at the same time or immediately after this active low reset, often other PCI bus signals are also asserted active low and which also may clear any information from a device or devices connected to receive those signals. Therefore, if this single reset signal is asserted in an attempt to achieve the D3 cold state, then the PCI-connected units would operate in the same manner as during a reset caused at system start up. Such an approach is unacceptable as detailed below.

While the above PCI operations have proven useful for reset operations, it has been observed that the prior methodology is insufficient given the advancement of the use of so-called PCI power management event ("PME") specifications, and is further inadequate in the mobile computing environment. A PME occurs when a device wishes to wake the system, at least as far as the particular device is concerned, from a deep sleep state. More particularly, in newer technologies supporting PME, each PCI unit and any controller connected between such unit and the PCI bus includes a PME register, and included in that register is an event bit which the corresponding unit sets when it causes a PME to occur. A device also may store information in that register or in an additional register (e.g., a card status change register), where the information identifies the type of event which gives rise to the need to awaken the system from the sleep state. Thus, when a PME occurs, the system may check the PME register of each of the PCI units having such a register and determine from that information which unit caused the PME, and it may further be determined what type of event requires service. For example, if the device in question is a modem that was in a deep sleep state and received an incoming ring during that state, the modem may initially respond by setting its PME event bit to awaken the system insofar as the modem is concerned, and then to respond to the incoming call.

Given the preceding background, the present inventors were faced with the evolution of PME operation and the specifications required of the PCI bus and PCI-compliant devices. In addition, it is has been noted by the present inventors as well as through their efforts in collaboration with others that the state of the art for PCI devices poses conflicts with the advancements of specifications for mobile computers. From this collaboration as well as through the additional input of others, a PCI Bus Power Management Interface Specification for PCI to CardBus Bridges was developed and has imposed certain restrictions on the present inventors and others when considering designs for PCI compliance in mobile computers. More specifically, the PCI Bus Power Management Interface Specification for PCI to CardBus Bridges states that in order for PCI controllers to comply with the specification, the power management event bit as well as the identifier of what caused a PME to occur must be available from the controller upon wake-up from a deep sleep; however, the PCI Bus Power Management Interface Specification for PCI to CardBus Bridges does not provide a mechanism for ensuring that this information is available in this manner, and it also does not address other information which otherwise may be affected during either or both of the deep sleep state or the waking of the PCI device from that state. In view of these considerations, a key drawback has been observed in that the reset operation caused by a PCI reset could effectively prohibit the proper maintenance or availability of PME and related information when it is desired to awaken a PCI device from a deep sleep state. Accordingly, there arises a need to improve upon the prior art and provide a system for more properly accommodating PCI protocol and the PCI Bus Power Management Interface Specification for PCI to CardBus Bridges while supporting the power savings provided by PME operations.

BRIEF SUMMARY OF THE INVENTION

In one preferred embodiment, there is a controller for coupling between a computer bus and one or more units compatible with the bus. The controller comprises a first input for receiving a first reset signal issued from the computer bus, a second input for receiving a second reset signal. The controller further comprises circuitry for storing a first set of information which will be cleared in response to assertion of the first reset signal. Lastly, the controller comprises circuitry for storing a second set of information which will not be cleared in response to assertion of the first reset signal but which will be cleared in response to assertion of the second reset signal. In a described embodiment, the bus is a PCI bus, the first reset signal is a PCI Reset signal, and the second reset signal is an initialization signal. Other circuits, systems, and methods are also described and claimed.

DETAILED DESCRIPTION OF THE INVENTION

Figure 1:
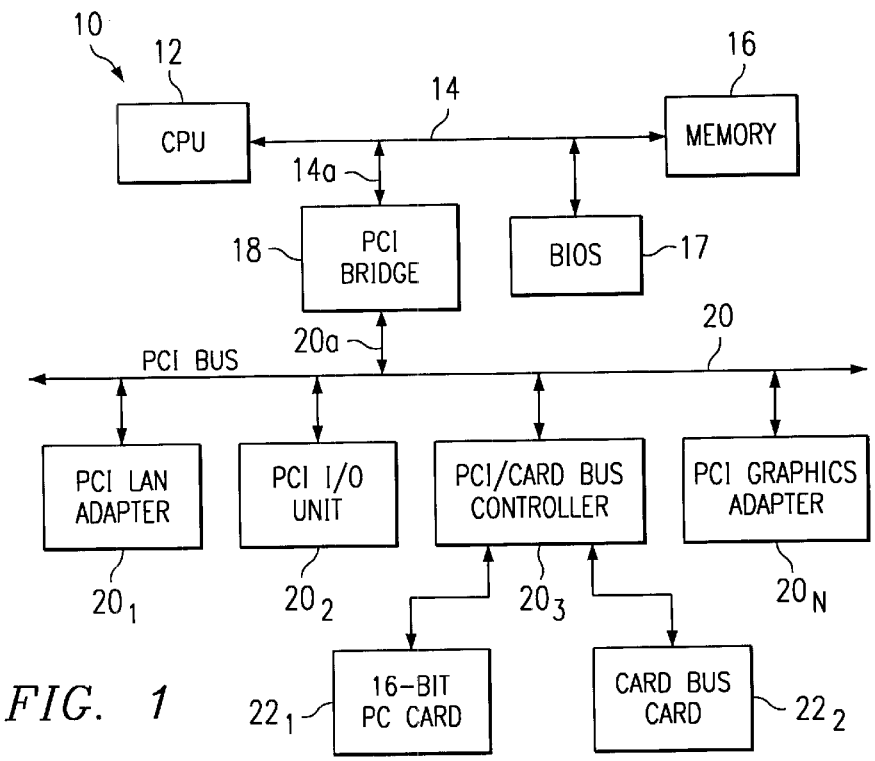
FIG. 1 illustrates a computer system implementing a PCI bridge, PCI bus, and various PCI units connected to the PCI bus.

FIG. 1 illustrates a computing system 10 in which the preferred embodiment may be implemented, and that is shown only by way of example. System 10 may be considered prior art if only examined in its block from, but the aspects included within it and detailed below as pertaining to separate data clearing signals provide a key aspect which distinguish system 10 as a whole from the prior art Before examining those aspects, and looking to system 10 generally, it illustrates an electrical diagram which may be included in various computing devices, with portable computers such as laptop or notebook computers as examples. Other examples will be ascertainable by one skilled in the art, and system 10 therefore provides a context from which other applications of the inventive teachings of this document may be applied. Turning then to system 10 in more detail, it includes a central processing unit ("CPU") 12 which is sometimes referred to as the host or as part of the host system. CPU 12 communicates via a local bus 14 to a memory system 16. Memory system 16 includes a main memory and may include other memories such as cache memory. In addition, a BIOS 17 is also connected to local bus 14, and stores information often particularized for the particular computer which houses system 10. Local bus 14 is further connected via a primary bus 14a to a PCI bridge 18. PCI bridge 18 represents the connection between the subsystems of the processor's main memory, and is coupled via a secondary bus 20a, to a PCI bus 20. PCI bridge 18 may be constructed in various fashions, and a common characteristic which distinguishes it from other bus systems is that it independently performs burst accesses. In other words, PCI bridge 18 may independently join together incoming single read transfer or single write transfer operations to form burst accesses if the addresses of the individual accesses are close, or are sequential, with respect to one another. In any event, various details of such a bridge device may be found in numerous references available in the PCI art.

In system 10, a number N of PCI units (also sometimes referred to as PCI agents) are connected to and compatible to communicate with PCI bus 20. These units are shown in FIG. 1 as units $20_1$ through $20_N$. Such units may be of various types, and in the present example therefore unit $20_1$ is a local area network ("LAN") adapter, unit $20_2$ is an I/O unit, unit $20_3$ is a PCI/CardBus controller, and unit $20_N$ is a graphics adapter. In the preferred embodiment, each of units $20_1$, $20_2$ and $20_N$ may have further devices connected thereto, but such devices are not shown to simplify the Figure and because the remaining discussion of this document is primarily focused on the inventive aspects of PCI/Card bus controller $20_3$. Lastly, it is noted that the decoupling of memory system 16 and PCI bus 20 through PCI bridge 18 is sufficient such that bridge 18 and CPU 12 may operate in parallel, provided that CPU 12 is not at that time addressing any of PCI units $20_1$ through $20_N$. As a result, it is possible to exchange data between two PCI units via PCI bridge 18 while CPU 12 is addressing memory 16, such as to perform a program or other operation.

Turning the focus now to the inventive controller $20_3$ in greater detail, note that it is first identified above as a PCI/CardBus controller. This controller also connects to devices that are compatible to communicate with PCI bus 20, and since it is a CardBus controller, then it maintains backward compatibility with 16-bit PC Cards or may further support CardBus Cards. To illustrate this aspect, FIG. 1 further illustrates both a 16-bit PC Card $22_1$ and a CardBus Card $22_2$ connected to controller $20_3$. To further appreciate the remaining discussion, both of these supported devices are further introduced here. PC Cards, formerly known as PCMCIA cards, are generally used in systems based on the Industrial Standard Architecture ("ISA") bus. As a result, PC Cards are often constrained in performance due to the limitations of the ISA bus. Commonly recognized benefits of PC Cards are their small form-factor, low power consumption, and hot insertion support Turning now to CardBus Cards, they combine the low-power, small form factor, and hot insertion capability of PC Cards with the improved performance provided by the PCI bus. For example, under current standards, CardBus Cards have a maximum theoretical throughput of 132 MB/second in contrast to a maximum theoretical throughput of 20 MB/second for a PC Card. In addition, CardBus Cards are automatically detected and configured upon insertion. In contrast to a 16-bit PC Card, however, when a CardBus Card is inserted and detected the system configures the interface to provide the same enhanced capabilities available to a 32-bit PCI device (including bus mastering).

Figure 2:
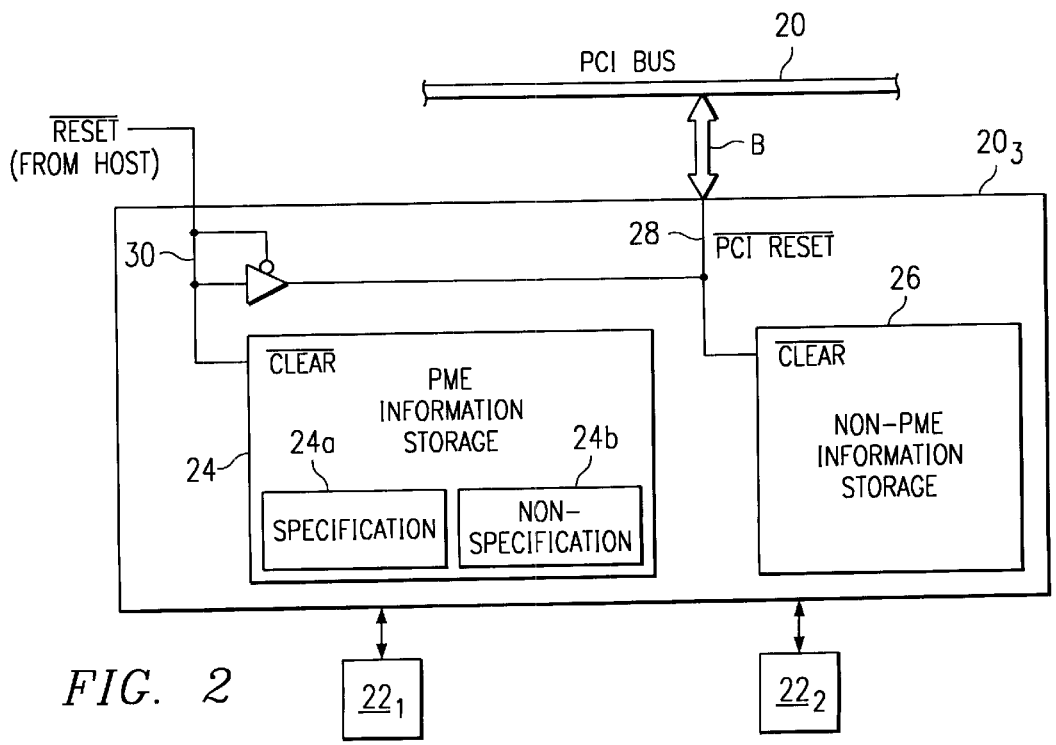
FIG. 2 illustrates the information clearing aspects of the PCI/CardBus Controller of FIG. 1 in greater detail.

FIG. 2 illustrates controller $20_3$ in still additional detail, with various other items carried forward or emphasized from FIG. 1 to demonstrate the power management features of the preferred embodiment. Once again, FIG. 2 illustrates that PCI bus 20 is connected to controller $20_3$. In this regard, note that the bus B which makes this connection may include various signals and, indeed, in the preferred embodiment it is contemplated that such signals will include those corresponding to an appropriate PCI specification. Of important focus for the present discussion, one of these signals is identified as $\overline{\text{PCI Reset}}$, where the overscore is intended for purposes of this document to indicate that the signal is an active low signal. The $\overline{\text{PCI Reset}}$ signal is the reset signal discussed in the Background Of The Invention section of this document, and note further now that in the prior art such signal is asserted for a global reset such as at start-up and may have been contemplated for assertion to place the PCI units into a D3 cold state. Importantly, however, in the preferred embodiment controller $20_3$ includes circuitry which limits the effect of asserting $\overline{\text{PCI Reset}}$, as will be evident from the remaining discussion below.

For operational reasons discussed later, controller $20_3$ in the preferred embodiment separates into two different blocks circuitry relating to PME information and circuitry not relating to PME information, with those blocks labeled PME information storage circuit 24 and non-PME information storage circuit 26 in FIG. 2. Before detailing the types of circuitry in each such block, note that the block representation is only intended to be logical in nature, that is, circuitry of one block is controlled for purposes of clearing information in a manner differently than in the other as detailed below, but the actual physical layout of the circuitry is not necessarily separated in this manner. Given these observations, each of PME information storage circuit 24 and non-PME information storage circuit 26 is further explored below.

For purposes of contrasting certain types of information and also relating some of that information to the PCI Bus Power Management Interface Specification for PCI to CardBus Bridges discussed in the Background Of The Invention Section of this document, PME information storage circuit 24 is further illustrated as having a specification storage circuit 24a and a non-specification storage circuit 24b. Again, this illustration is only logical in nature and, thus, the information of these two blocks and the circuitry for storing that information may or may not be physically related. In any event, both of circuits 24a and 24b store information relating to PME. More specifically, however, the information in specification storage circuit 24a is that which is set forth in the PCI Bus Power Management Interface Specification for PCI to CardBus Bridges as required to be available in the CardBus controller upon waking from a D3 state, while the information in nonspecification storage circuit 24b is additional information as determined for various reasons by the present inventors also to be included in the preferred embodiment and to be available in controller $20_3$ upon waking from a D3 state. Each of these different types of PME information is discussed below.

Looking to the particular types of information in specification storage circuit 24a, it stores three types of PME information, namely, the PME enable, the PME status, and the PME power state, where a different set including each of these information types is stored for each CardBus card supported by controller $20_3$. Thus, in the example of FIG. 1, a first set of such information is stored for CardBus card $22_2$ and a second set of such information would be stored if the second card connected to controller $20_3$ in FIG. 2 were also a CardBus card (which, in the example of FIG. 2 it is not). Looking more specifically to these three types of PME information, PME enable indicates to controller $20_3$ whether it is enabled to indicate to PCI bus 20 that a PME has occurred. PME status is used by controller $20_3$, when enabled to indicate a PME, to actually indicate that a PME has occurred. The PME power state commands controller $20_3$ to place the devices connected to it in a certain power state, where the state may be any of D0 through D3. In addition to the just-described PME information specification storage circuit 24a also stores various socket related information, again because the PCI Bus Power Management Interface Specification for PCI to CardBus Bridges calls for such information to be available in a CardBus controller upon waking from the D3 cold state. Such socket related information includes the socket event, the socket mask, and the socket control register. The socket event indicates an identifier of the type of event or interrupt which caused the PME to be asserted. As examples, a card status change or a battery low signal are types of socket events. The socket mask has mask bits for the socket events. The socket control register applies power to the card according to CardBus standards and, thus, may include by way of example control settings so that some cards receive a voltage on the order of 5 volts while other cards receive a voltage on the order of 3 volts. Lastly, because controller $20_3$ also supports backward compatibility to non-CardBus 16 bits PC cards, note that specification storage circuit 24a also stores information comparable to the socket information for CardBus cards, where this comparable information however corresponds to any 16 bits PC card connected to controller $20_3$ (e.g., such as 16-bits PC Card $22_1$ in FIG. 2). Although the above-described information stored in specification storage circuit 24a is located within PME information storage circuit 24 due to the requirement of the PCI Bus Power Management Interface Specification for PCI to CardBus Bridges, note that the particular manner of ensuring that this information is immediately available upon waking from the D3 cold state is not set forth in the PCI Bus Power Management Interface Specification for PCI to CardBus Bridges. For the preferred embodiment, this mechanism preserves each of the above-described types of information during the D3 cold state, and that mechanism is further appreciated from the operational description provided later after detailing the additional information stored in non-specification storage circuit 24b and in non-PME information storage circuit 26.

Looking now to the particular types of information in non-specification storage circuit 24b, note generally that this is information as selected by the present inventors as also providing benefits by having such information immediately available upon waking from the D3 cold state, although such information is not specified in the PCI Bus Power Management Interface Specification for PCI to CardBus Bridges. Moreover, while various types of information are included here, alternative embodiments may be created where only some of this information is preserved for availability in controller $20_3$ upon waking from the D3 cold state, or yet other alternatives may be formed where information in addition to that specified below is also preserved for such availability. In any event, in the preferred embodiment the information stored in non-specification storage circuit 24b may be considered generally in two categories. A first category relates to information which is earlier loaded into non-specification storage circuit 24b, typically during boot-up, from BIOS 17. A second category relates to backward compatibility information used to support non-CardBus 16 bits PC cards. Each of these categories is detailed further immediately below.

The preferred information in non-specification storage circuit 24b from BIOS 17 involves various different matters.

One type of information relates to interrupt handling. More particularly, this information identifies what types of interrupts must be managed by controller $20_3$, and also the routing of such interrupts. For example, routing may involve routing interrupts to IRQ PCI interrupts, or providing serial interrupt streams. Another type of information is an indicator of whether controller $20_3$ is enabled to permit burst reads, or may merely provide single reads in response to each corresponding single read request. Still another type of information is an indicator of whether controller $20_3$ is enabled to provide so-called $V_{CC}$ protection. More particularly, when $V_{CC}$ protection is enabled, controller $20_3$ performs an interrogation of a card when the card is inserted and, in response to the interrogation there is a determination of how much voltage is to be provided by controller $20_3$ to that card. Thus, the indicator of whether this functionality is enabled is also stored in non-specification storage circuit 24b. Another type of information is an alternative clock selection enable. More particularly, when alternative clock selection is enabled, controller $20_3$ switches to a clock which is an alternative from the PCI bus-supplied clock signal. The alternative clock may be another external clock signal supplied to a different pin of controller $20_3$ or, alternatively, may be an oscillator formed internally within controller $20_3$. In any event, use of the alternative clock may be beneficial during the D3 cold, particularly because the PCI bus-supplied clock signal may not be available or supplied during that time. As a result, if alternative clock selection is enabled, controller $20_3$ operates in response to its alternative clock and, as a result, may still perform certain operations such as the interrogation process described above with respect to $V_{CC}$ protection. As yet another type of information, in the preferred embodiment controller $20_3$ includes circuitry for performing DMA communications. In this regard, during initialization BIOS 17 communicates DMA channel information to controller $20_3$ to either enable or disable DMA, and also to indicate whether 8 bit or 16 bits DMA is permitted. This DMA channel information is also stored in non-specification storage circuit 24b. As still another type of information, in the preferred embodiment controller $20_3$ includes circuitry for receiving video data, sometimes referred to as zoom video, when a video card attached to controller $20_3$. Additionally, controller $20_3$ may then output that video data directly to a destination such as a video controller. In this regard, also preferably stored in non-specification storage circuit 24b is a bit to enable this functionality, as well as a bit to cause controller $20_3$ to perform an auto-detection function whereby it determines when video data is available from the video card for provision to the video controller. In a sometimes related manner, controller $20_3$ also preferably includes circuitry for receiving audio data and providing it to an audio device, such as a speaker. The bit to enable this receipt and output function is also stored in non-specification storage circuit 24b. As another type of information, in the preferred embodiment controller $20_3$ includes various general purpose pins such that during initialization BIOS 17 communicates values to these pins which thereby configure controller $20_3$ to perform one or more different functions. For example, one such function enables controller $20_3$ to drive an LED. In any event, once this configuration is established via these pins, it also is stored in non-specification storage circuit 24b. Lastly, in the preferred embodiment controller $20_3$ is operable to provide a ring indicate signal, thereby indicating in a manner other than an interrupt that a modem card connected to controller $20_3$ is receiving a ring signal. This function is also enabled from BIOS 17, and an indication of whether such function is enabled is also preferably stored in non-specification storage circuit 24b.

Having described numerous signals from BIOS 17 which are preserved in nonspecification storage circuit 24b during a D3 cold state, it is now instructive to examine a key benefit of this functionality. Specifically, since this information is preserved during the D3 cold state, then it is inmmediately available to system 10 upon waking from that state. As a result, there is no need, at least as far as controller $20_3$ is concerned, to have to once again retrieve this information from BIOS 17. In contrast, if this information were not preserved by controller $20_3$ during the D3 cold state, then such information would have to be once again provided from BIOS 17 to controller $20_3$. In this instance, therefore, the time consumed may well approximate that of another initialization (i.e., boot up) operation, and such a consequence is likely to be very undesirable. Thus, the preferred embodiment avoids this otherwise possible delay.

Recall that non-specification storage circuit 24b in the preferred embodiment also stores a category of information relating to backward compatibility information used to support non-CardBus 16 bits PC cards. More particularly, it has been recognized by the present inventors that in some instances the backward compatibility support of 16 bits PC cards is such that some parameters may simultaneously govern more than one such card as connected to controller $20_3$. For example, the registers of controller $20_3$ are memory mapped and, in this regard, controller $20_3$ includes base address registers which are therefore necessarily consulted to determine the memory mapping of the corresponding registers in memory. However, in the present embodiment, only one such base register is used to map to all sockets for 16 bits PC cards. Thus, the present inventors recognize that if two 16 bits PC cards are connected to controller $20_3$ at a time, and a first one of these cards were placed in the D3 state while a second one of these cards remained in the D0 state, then despite the deep sleep of the first card it is desirable not to disturb the memory mapping base register contents since that would affect the ability to access the memory mapped register corresponding to the still awake second card. Consequently, the information stored in the memory mapping base register which supports 16 bits PC cards is also stored in non-specification storage circuit 24b.

Having described the information in PME information storage circuit 24 and looking now in contrast to non-PME information storage circuit 26, note that it stores information which is permitted to be cleared during the D3 cold state. By way of example, such information is much of the information which is provided by the operating system in the standard PCI configuration space. More particularly, His information may include memory and I/O base address registers for CardBus devices, and also may include PCI bus numbers, CardBus bus numbers, and latency timers. Still other examples will be ascertainable by one skilled in the art.

The separation of circuitry into blocks 24 and 26 is further understood by way of additional connections relating to clearing the information stored in the circuits of those blocks, as is described here first by way of connection and later by way of operation. In this regard, in the preferred embodiment the $\overline{\text{PCI Reset}}$ signal is connected via a conductor 28 to the $\overline{\text{CLEAR}}$ input of non-PME information storage circuit 26. As its name suggests, the $\overline{\text{CLEAR}}$ input, when asserted low, clears the information stored in circuit 26. In contrast, a second signal, designated as $\overline{\text{RESET}}$, is connected via a conductor 30 to the $\overline{\text{CLEAR}}$ input of PME information storage circuit 24, which should be understood as further operable therefore to clear the information stored in circuits 24a and 24b. In the preferred embodiment, $\overline{\text{RESET}}$ is provided by the host and, therefore, is preferably controlled via CPU 12 either directly or through some intervening circuitry (e.g., glue logic). In addition, $\overline{\text{RESET}}$ is also connected to both the signal input and control input of a passgate 32. The output of passgate 32 is connected to conductor 28. Accordingly, when $\overline{\text{RESET}}$ is asserted low, it also enables passgate 32 and the low signal passes to conductor 28.

Given the preceding connections, the operation of controller $20_3$ in connection with system start-up or some other initializing event is as follows. For either of these events, $\overline{\text{RESET}}$ is asserted by the host, perhaps via some intervening glue logic or the like. The low $\overline{\text{RESET}}$ signal is connected directly to the $\overline{\text{CLEAR}}$ input of PME information storage circuit 24; therefore, the information stored in circuits 24a and 24b of circuit 24 is cleared, which is the desired result for initialization. In addition, the low assertion of $\overline{\text{RESET}}$ causes passgate 32 to conduct, thereby passing the low signal from the input of passgate 32 to its output and, hence, to conductor 28. As a result, this assertion of $\overline{\text{RESET}}$ also clears the information in non-PME information storage circuit 26. Thereafter, when $\overline{\text{RESET}}$ is unasserted, both PME information storage circuit 24 and non-PME information storage circuit 26 may operate under typical operations.

Also given the preceding connections, the operation of controller $20_3$ in connection with power management in the context of PCI operations is as follows. When a D3 cold state is desired, $\overline{\text{PCI Reset}}$ is asserted low from PCI bus 20. Given the connections of the preferred embodiment, however, note that this assertion only clears the information stored in non-PME information storage circuit 26 and, thus, does not affect that information stored in circuits 24a and 24b of PME information storage circuit 24. Thus, while the D3 cold state continues, $\overline{\text{PCI Reset}}$ may remain active low, yet it will continue not to affect any information which may change in circuits 24a and 24b of PME information storage circuit 24. For example, assume now that 16-bit PC Card 22a is a modem and, during the D3 cold state, it receives an incoming call (i.e., a ring). Accordingly, it will set its PME bit and assert a PME to controller $20_3$. In response, PME information storage circuit 24 of controller $20_3$ sets a corresponding PME bit, and it sets additional information indicating that it is PC Card $22_1$ which caused the PME (as opposed to CardBus Card $22_2$ or some other unit). During this time, since the asserted low $\overline{\text{PCI Reset}}$ signal does not affect PME information storage circuit 24, then PME information storage circuit 24 is capable of storing and maintaining this information. Accordingly, when PCI bus 20 is made aware of the PME, it may properly poll controller $20_3$ and determine the cause and related information pertaining to the PME. Thus, a smooth response and awakening of the system may occur to the PME will still maintaining compliance with the use of the $\overline{\text{PCI Reset}}$ signal.

From the above, it may be appreciated that the above embodiments provide a computing system which includes a PCI architecture and, more specifically, permits a PCI-connected controller to efficiently transition to a deep sleep state while maintaining sufficient operation to awaken from that state in response to a PME. Moreover, while the preferred embodiment has been described above, various substitutions, modifications or alterations could be made to the descriptions set forth above without departing from the inventive scope. For example, system 10 of FIG. 1 is by way of illustration, and other systems implementing PCI may likewise benefit from the current teachings. As another example, controllers outside of the context of PCI may implement some of the present concepts if appropriate. As still another example, while certain examples of PME related information are shown to be unaffected by the assertion of the $\overline{\text{PCI Reset}}$ signal above, still other types of information likewise may be preserved while the $\overline{\text{PCI Reset}}$ signal is asserted active low. Thus, in appropriately constrained systems these other considerations also may fall within the inventive scope, as is defined by the following claims.

What is claimed is:

1. A controller for coupling between a PCI bus and one or more units compatible with the bus, the controller comprising:

a first input for receiving a first reset signal issued from the computer bus, wherein the first reset signal comprises a PCI reset signal;

a second input for receiving a second reset signal;

circuitry for storing a first set of information which will be cleared in response to assertion of the first reset signal, and also will be cleared in response to assertion of the second reset signal; and circuitry for storing a second set of information which will not be cleared in response to assertion of the first reset signal but which will be cleared in response to assertion of the second reset signal, wherein the second set of information comprises power management information, and the first set of information does not comprise power management information.

2. The controller of claim 1 wherein the second reset signal comprises an initialization signal.

3. The controller of claim 1 wherein the power management information comprises a power management enable bit.

4. The controller of claim 1 wherein the power management information comprises a power management status indicator.

5. The controller of claim 1 wherein the power management information comprises a power management power state indicator.

6. A controller for coupling between a computer bus and one or more units compatible with the bus, the controller comprising:

a first input for receiving a first reset signal issued from the computer bus;

a second input for receiving a second reset signal;

circuitry for storing a first set of information which will be cleared in response to assertion of the first reset signal;

circuitry for storing a second set of information which will not be cleared in response to assertion of the first reset signal but which will be cleared in response to assertion of the second reset signal; and a plurality of general purpose pins for receiving a configuration signal representative of one or more functions to be performed by the controller, wherein the second set of information comprises the configuration signal.

7. A controller for coupling between a computer bus and one or more units compatible with the bus, the controller comprising:

a first input for receiving a first reset signal issued from the computer bus;

a second input for receiving a second reset signal;

circuitry for storing a first set of information which will be cleared in response to assertion of the first reset signal;

circuitry for storing a second set of information which will not be cleared in response to assertion of the first reset signal but which will be cleared in response to assertion of the second reset signal; and circuitry for responding to interrupts, wherein the second set of information comprises interrupt information.

8. The controller of claim 7, wherein the interrupt information comprises information for identifying types of the interrupts.

9. The controller of claim 7, wherein the interrupt information comprises information for identifying routing information corresponding to the interrupts.

* * * * *